United States Patent [19]

Wall

[11] Patent Number: 5,077,050
[45] Date of Patent: Dec. 31, 1991

[54] CONDIMENT CONTAINER

[76] Inventor: Rocco J. Wall, 158 Roessler St., Boonton, N.J. 07005

[21] Appl. No.: 519,508

[22] Filed: May 7, 1990

[51] Int. Cl.⁵ .............................................. B65D 85/72
[52] U.S. Cl. ................................. 426/124; 206/521; 206/525; 206/541; 426/115; 426/128
[58] Field of Search .............. 426/124, 120, 115, 128; 206/541, 542, 521, 525; 222/565, 598; 220/523, 524, 525, 528, 556; 229/902, 903, 904

[56] References Cited

U.S. PATENT DOCUMENTS

| | | | |
|---|---|---|---|
| 1,514,379 | 11/1924 | Fleischer | 426/115 |
| 1,760,761 | 5/1930 | March | 426/120 |
| 2,617,577 | 11/1952 | Tardiff | 229/15 |
| 2,627,992 | 2/1953 | Kurz | 220/525 |
| 2,784,895 | 3/1957 | Linwood, Jr. et al. | 426/124 |
| 2,924,372 | 2/1960 | Kirkeby | 229/904 |
| 3,180,739 | 4/1965 | Stoker | 426/124 |
| 3,381,875 | 5/1968 | Tunick | 220/524 |
| 3,442,435 | 5/1969 | Ludder et al. | 229/904 |
| 3,759,720 | 9/1973 | Young | 426/124 |
| 3,771,713 | 11/1973 | Davidson | 229/27 |
| 4,495,404 | 1/1985 | Carmichael | 206/541 |
| 4,498,586 | 2/1985 | Vitale | 206/525 |
| 4,600,592 | 7/1986 | Dobis | 426/120 |
| 4,700,843 | 10/1987 | Cohen | 206/521 |
| 4,877,609 | 10/1989 | Beck et al. | 426/87 |
| 4,946,094 | 8/1990 | Stang | 206/542 |

FOREIGN PATENT DOCUMENTS 1051742 1/1954 France ........................ 206/542

Primary Examiner—Donald E. Czaja
Assistant Examiner—A. J. Weier
Attorney, Agent, or Firm—Mathews, Woodbridge & Collins

[57] ABSTRACT

An article for supporting the lid of a cardboard box for a food item. The article has a container with a base, at least one sidewall extending from the base to a lid support opposite the base, and at least one compartment. There is at least one support leg extending from the container in a direction opposite the lid support. The legs have support ends opposite the container. There is sufficient distance between the base of the container and the support ends of the legs to avoid contact between the container and the food item.

16 Claims, 3 Drawing Sheets

FIG-1 PRIOR ART
FIG-2
FIG-3
FIG-4
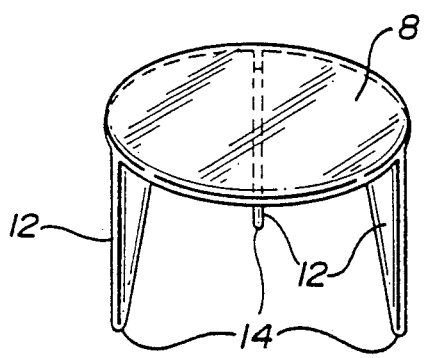
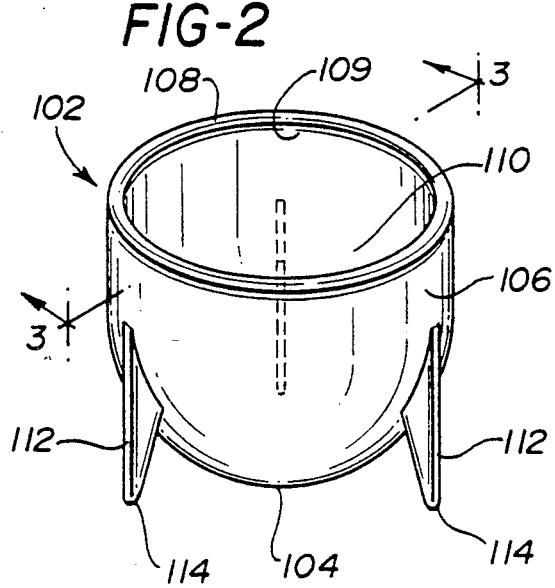
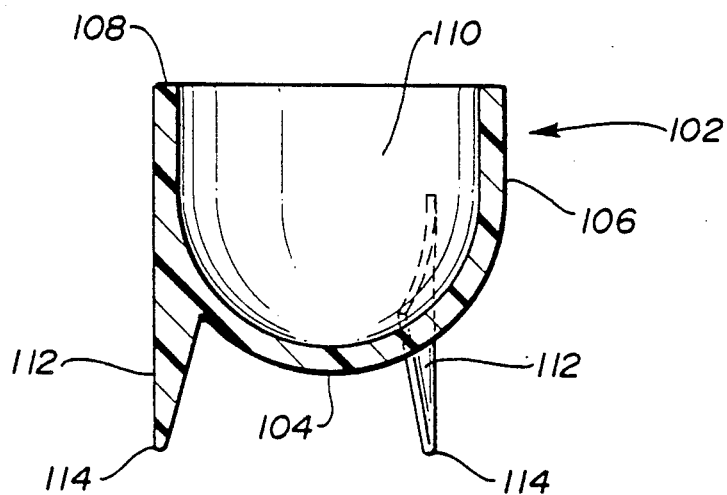
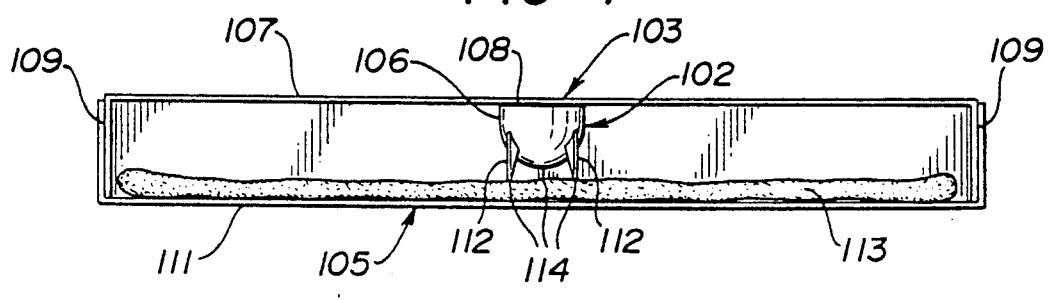

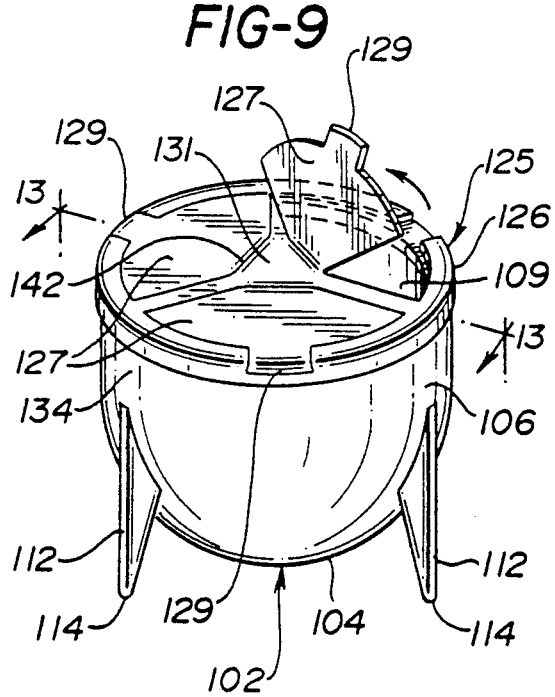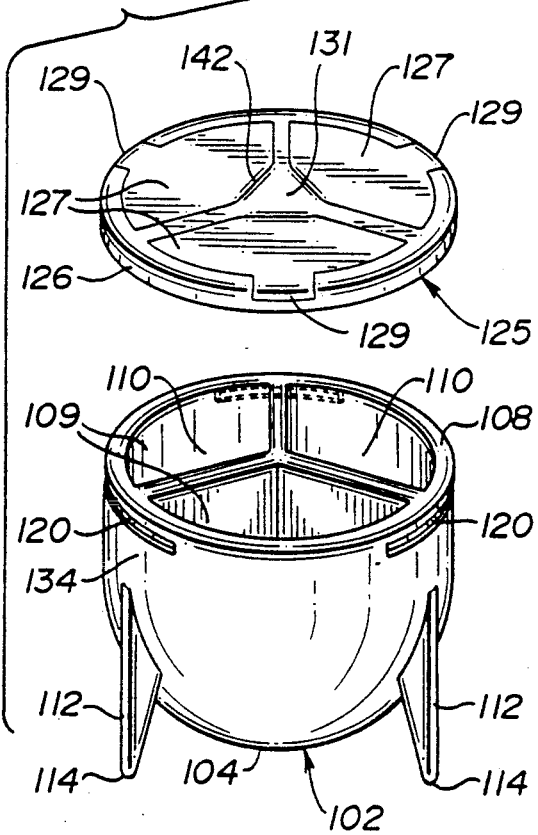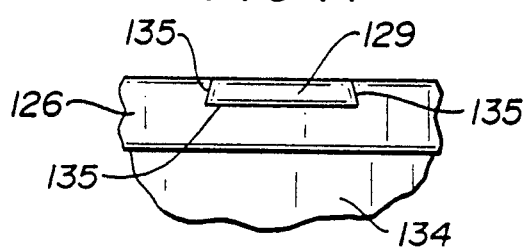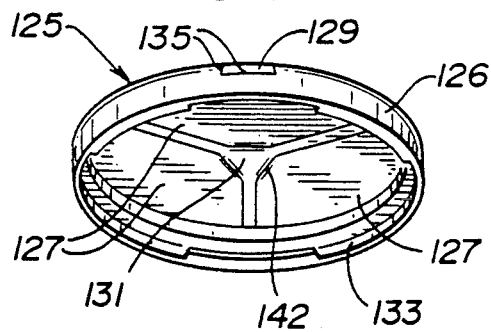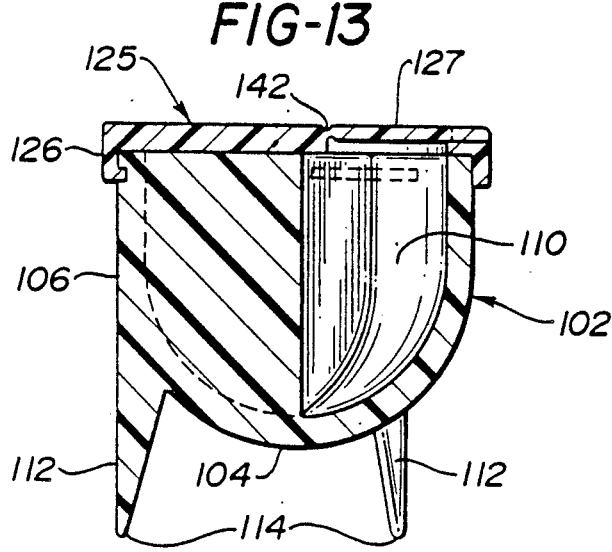

5,077,050

CONDIMENT CONTAINER

FIELD OF THE INVENTION

The present invention is in the field of packaging devices, and more particularly relates to a device which is useful to support the lid of a box and comprises a container.

DESCRIPTION OF THE RELATED ART

When items, such as food, are packaged within boxes which have relatively large and flimsy covers, the central portion of the cover can bend or sag down onto the food item thereby damaging it. This is especially true when the boxes are stacked for storage or delivery.

Tardiff, U.S. Pat. No. 2,617,577, pertains to a package wherein articles are individually supported so as to be held in fixed relation to each other and to the interior surface of the package. The package comprises a paper carton and a tray which is adapted to be inserted within the carton. The tray is provided with means for holding one or more articles and is so dimensioned that in the closed carton it remains in fixed position.

Davidson, U.S. Pat. No. 3,771,713, pertains to a tray for pies, as for example, pizza, fruit, or cream. The tray is divided into a number of equal size sectors by double partition walls, between which a pie portion is placed in order to obviate the need to cut the pie in order to take a portion and so that when the pie is heated the portions will not coagulate. By cutting the tray along the tops of the walls individual pie portions can be removed from the remainder of the tray.

Vitale, U.S. Pat. No. 4,498,586, discloses a molded plastic device which is used in boxes or packages, such as pizza boxes, where there is a tendency for large cover portions to sag downward and damage the soft pizza or other contents. The device is placed centrally on the pie or other product to support the cover during storage and delivery. The device is unitary and in its preferred form has spaced vertical legs which are connected to a cover support. The lower portions of the legs have a minimal but flat cross section to minimize marking of the protected article.

Cohen, U.S. Pat. No. 4,700,843, pertains to a one piece folded carton for food containment which has a detachable support element which can be folded and interlocked into a collar-like structure to be placed onto the item of food to provide central support to the top of the carton. This invention is useful in packaging pizza and the like for transportation and storage.

Beck et al., U.S. Pat. No. 4,877,609, discloses a combination serving utensil and pizza container support. The device has a server portion appropriate to serve a slice of pizza, and an upstanding portion which has a vertical dimension which when the server portion is placed between the pizza and the base of the container, approximates the height of the pizza container, there is also a handle portion which has a flat upper surface and is attached to the upper end of the upstanding portion. This handle extends parallel to but offset from the server portion.

SUMMARY OF THE INVENTION

The present invention pertains to an article for supporting the lid of a cardboard box which can be used to package a food item, as for example, a pizza. The article for supporting the lid comprises a container having a base, at least one sidewall extending from the base to a lid support opposite the base, and at least one, and preferably three compartments. There is at least one, and preferably three support legs, extending from the container in a direction opposite the lid support. Each leg has a support end opposite the container. There is sufficient distance between the base of the container and the support ends of the legs to avoid contact between the container and the food item. There can be a means to close each of the compartments, as for example, a dial, snap top, or foil seal.

The present invention also pertains to the combination of a box, an article, such as a food item packaged in the box, and an article for supporting the box lid. The box comprises a lid, at least one sidewall, and a base opposite the lid. The article comprises a container which has a base, at least one sidewall extending from the base to a lid support opposite the base, and at least one compartment having an opening. The lid support supports the cardboard box lid. There are at least one and preferably three support legs extending from the container in a direction opposite the lid support. The legs have support ends opposite the container and are supported on the food item with the lid support located immediately below the lid when the box is in the closed position. There is sufficient distance between the base of the container and the support ends of the legs to avoid contact between the container and the food item.

The present invention is especially convenient because while supporting the lid of a package containing a food item therein, it is also useful as a container for condiments which are traditionally served with the food item.

BRIEF DESCRIPTION OF THE DRAWINGS

FIG. 1 is a view in perspective of a prior art lid support.

FIG. 2 is a view in perspective of an embodiment of the article of the present invention.

FIG. 3 is a sectional view along 3—3 of the embodiment of FIG. 2.

FIG. 4 is a vertical section view of a cardboard pizza box with the article of FIG. 2 in place.

FIG. 9 is a perspective view of a preferred embodiment of the present invention having 3 compartments and a cover with tab closures.

FIG. 10 is an exploded view of the embodiment in FIG. 9.

FIG. 11 is a fragmentary elevational view of the embodiment in FIG. 3 showing the tab closure locking means.

FIG. 12 is a bottom perspective of the lid of FIG. 9.

FIG. 13 is a sectional view along 13—13 of FIG. 9.

DETAILED DESCRIPTION

Figure 5:
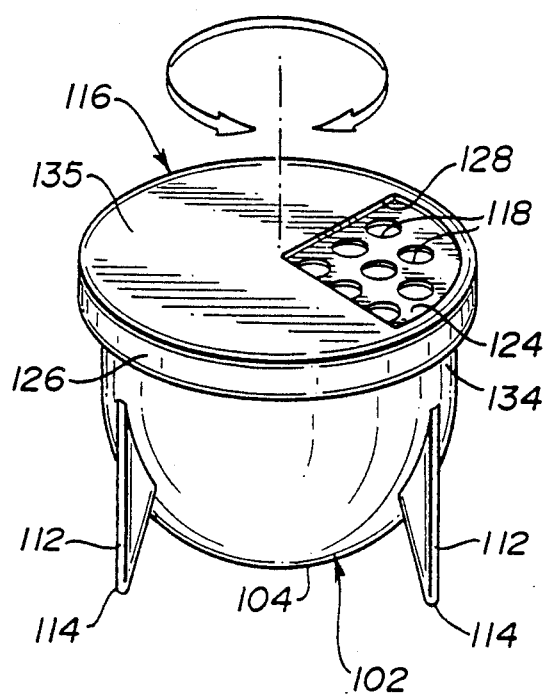
FIG. 5 is a perspective view of the article in FIG. 2 having a dial closure.

The present invention includes an improvement in an article of the type illustrated in FIG. 1, which is used for supporting the lid of a cardboard box for a food item. The article is "table"-like and has lid support 8 and legs 12 extending from one side of lid support 8. Legs 12 have support ends 14 opposite lid support 8. The preferred height of the article is equal to or slightly less than the height of the cardboard box for the food item.

In use, the article is positioned on top of and in the center of a food item, as for example a pizza, which has been packaged in a cardboard box. Support ends 14 penetrate the top layer of the food item, as for example, the cheese layer on a pizza, and rest on a lower layer of the food item, as for example, the pizza crust. Once the article is in position on the food item, lid support 8 is located immediately below the lid of the cardboard box. Lid support 8 prevents the box lid from sagging down onto the food item.

The present invention is an improvement in the prior art article which comprises a container which extends from the same side of lid support 8 from which legs 12 extend. The container has at least one compartment having an opening.

FIG. 2 and FIG. 3 illustrate an embodiment of an article according to the present invention. The article comprises container 102 having at least one sidewall 106 which extends from base 104 to lid support 108 opposite base 104, and at least one compartment 110 having an opening 109. Sidewall 106 has been illustrated as one continuous curved wall defining cylindrical container 102 having curved base 104, thereby resembling a "kettle". There is at least one, and preferably three, support legs 112, extending from container 102 in a direction opposite lid support 108. Legs 112 have support ends 114 opposite container 102. Support ends 114 preferably have "flat" or "blunt" surfaces.

Sidewall 106 is shown as one continuous curved sidewall which defines a kettle shaped container 102. The container can be shaped in any of a number of shapes, as for example, a three or four-sided "box", an inverted pyramid, animal-shaped, cartoon figure shaped, or novelty shaped, etc.

Container 102 preferably has from one to six preferably two to four, and most preferably three compartments. The compartments have an opening 109. The opening can be on the top, side or bottom of the container 102 and is preferably on the top of container 102. FIG. 10 shows such an embodiment of the present invention having three compartments 110 with opening 109 on top of the container.

When the article is used with a food item to support the lid of a package, the compartment(s) 110 serves to hold spices or condiments to be served with the food item. When accompanying a pizza, the condiments can include, for example, parmesan cheese, oregano, dried red pepper, salt, etc. The compartment can also be a packet or packets as, for example, cellophane, wax paper, or foil packets of spices, which has been attached by, for example, by tape or clip, to lid support surface 108. Additionally, the container can be used to hold other items as for example favors, etc. and should not be limited to containing condiments exclusively.

FIG. 4 illustrates the article of FIGS. 2 and 3 used to support box lid 107 of box 105 for a food item 113, preferably a pizza. The box 105, typically a cardboard box, comprises box lid 107, at least one, and preferably four box sidewalls 109, and base 111 opposite box lid 107. This embodiment of the present invention also includes the combination of box 105; a food item 113, here shown as a pizza, packaged therein and supported on base 111 of box 105 with article 103 supporting box lid 107.

The article is illustrated with sidewall 106 defining a cylindrical container 102 with curved base 104. The article has at least one compartment. Lid support 108 supports cardboard box lid 107.

The legs 112 are supported on the food item 113, here shown as a pizza, with the lid support 108 located immediately below box lid 107 when box 105 is closed. The support ends 114 of legs 112 preferably penetrate food item 113. As for example, in a pizza, the legs typically penetrate the soft layer of sauce and cheese and rest on the crust. The article is thereby "anchored" in place and its movement is minimized or avoided while box 105 is in transit.

There is sufficient distance between base 104 of container 102 and support ends 114 of legs 112 to avoid contact between base 104 of container 102 and food item 113. In this way the top layer of food item 113, as for example here, the cheese layer on a pizza, is not ruined once the article 103 has been placed upon it.

The distance between the base 104 of container 102 and support ends 114 of legs 112 is preferably from about 10% to 90%, more preferably from about 30% to 50%, and most preferably 20%–40% of the distance between the lid support surface 108 and support ends 114 of legs 112.

The distance between lid support surface 108 and support ends 114 of legs 112 defines the height of article 103. The height is preferably slightly less than the height of the sidewall 109 of box 105 in which the article is used. The sidewall 109 of box 105 for a pizza 113, typically measures from ¾ to 2 inches and is most commonly about one and a half inches from box lid 107 to base of the box 111, the height of the article is from about ⅝ to 2 ⅝ inches, and preferably from one and a half inches to two inches. The actual height of the article will vary with the height of the box in which its use is intended.

In FIGS. 2 through 4, legs 112 extend from the midportion of container 102. Legs 112 have support ends 114 for resting on food item 113. The support ends 114 have been illustrated as defining a "flat" or "blunt" surface. However, the support ends 114 can have pointed surfaces as do those illustrated in the embodiments of FIGS. 5 through 10 and FIG. 13. Preferably, support ends 114 have blunt surfaces to prevent them from penetrating through food item 113 into and through cardboard box 105.

Alternatively, lid support 108 can extend outward to form a "ledge" hanging over and around the periphery of container 102. Legs 112 can extend from the underside of the "ledge" in a direction opposite support 108.

The terms "leg" or "legs" includes any type of support from below for container 102 in which contact between base 104 and food item 113 is avoided or minimized, preferably legs like those shown in FIGS. 2 through 10 and FIG. 13. An example of an alternate support structure is a hollow cylindrical structure on which the container sits.

Preferably there is a means to close the openings in each of the compartments in the container. FIGS. 5 through 9 illustrate embodiments of the present invention having such means to close. The contents of the container can be dispensed through the closing means having a double cover as in FIG. 5 and 6 or a single cover as illustrated in FIGS. 7 through 10.

Figure 6:
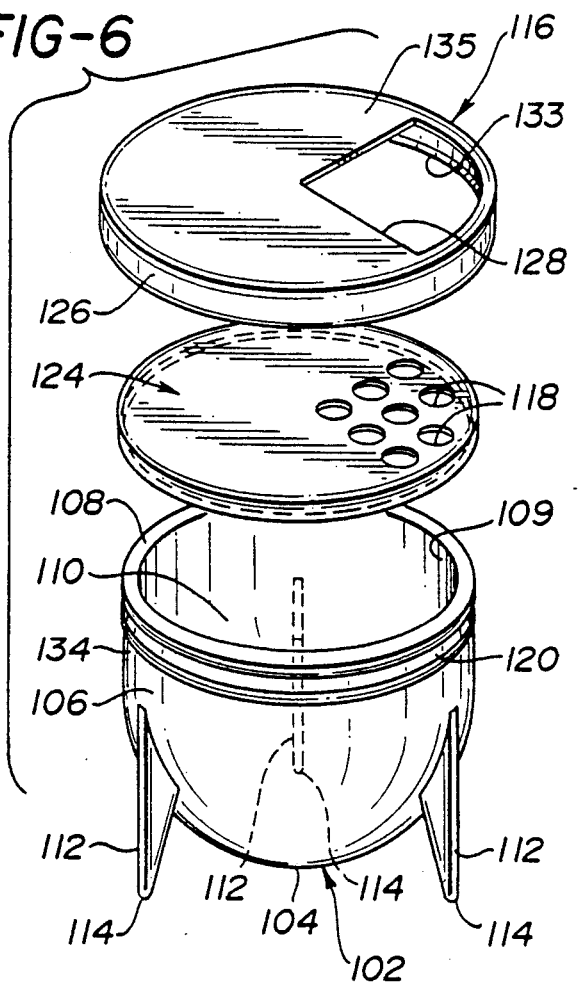
FIG. 6 is an exploded view of FIG. 5.

In the embodiment illustrated in FIGS. 5 and 6 the means to close includes top cover 116. There is a rim 126 extending from the circumference of cover 116 having an interior lip 133. The cover 116 is mounted on lid support surface 108 of container 102. The container 102 has at least one ridge 120 extending from outer wall 134 at a distance from the lid support surface 108 which is less than the distance of lip 133 from top surface 135 of cover 116. Circumferential ridge 120 preferably extends completely around outer wall 134. The cover 116 is preferably circular having an outer diameter greater than the corresponding outer diameter of lid support surface 108. The cover 116 is mounted to interlock on container 102 with lip 133 located beneath ridges 120. The cover 116 can rotate relative to lid support surface 108 of container 102. The cover 116 can have an aperture, such as 128, or optionally have a set of perforations. Cover 116 supports the box lid on lid support surface 108.

There can be a disc 124 serving as a bottom cover. The disc 124 has a set of perforations 118 and is interposed between the cover 116 and lid support surface 108. The diameter of disc 124 is preferably great enough so that it can be supported on the lid support surface 108. Disc 124 is permanently snapped onto container 102. Rotating cover 116 acts as a dial and can expose set of perforations 118 on disc 124 through aperture 128 in cover 116. When the container has more than one compartment as shown in FIGS. 9 and 10, there can be a set of perforations located preferably above each compartment 110.

In use, the cover 116 is "dialed" to expose set of perforations 118 in disc 124 through aperture 128 which are located above the compartment 110 holding the desired contents. The contents are then shaken or poured through the perforations 118.

Figure 7:
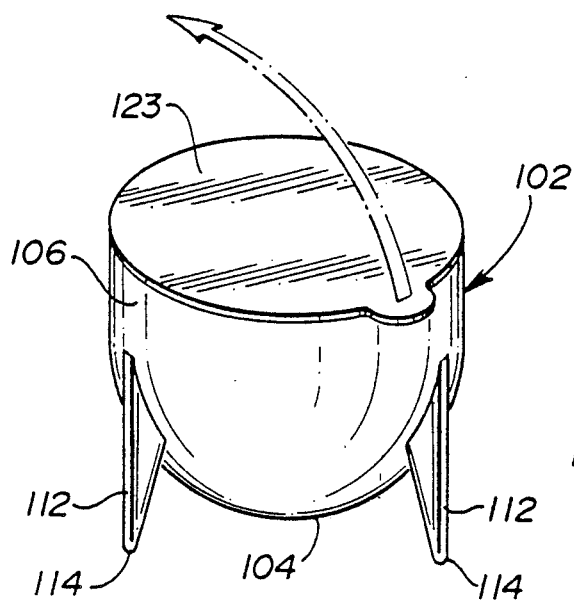
FIG. 7 is a perspective view of the embodiment in FIG. 2 having a foil seal closure.

FIG. 7 shows an embodiment of the present invention as depicted in FIG. 2 which has a means to close which is a foil seal closure. Foil seal 28 is resealably adhered with a suitable adhesive to lid support surface 108 of container 102. There can be a disc 124 having perforations 118 as depicted in FIGS. 5 and 6 located below foil seal 123. In use, foil seal 123 is peeled off of the lid support surface of container 102 to reveal either a set of perforations in a disc if present, or the contents of the container. Foil seal 123 can be made from any number of metallic foils well known in the art of food packaging.

Figure 8:
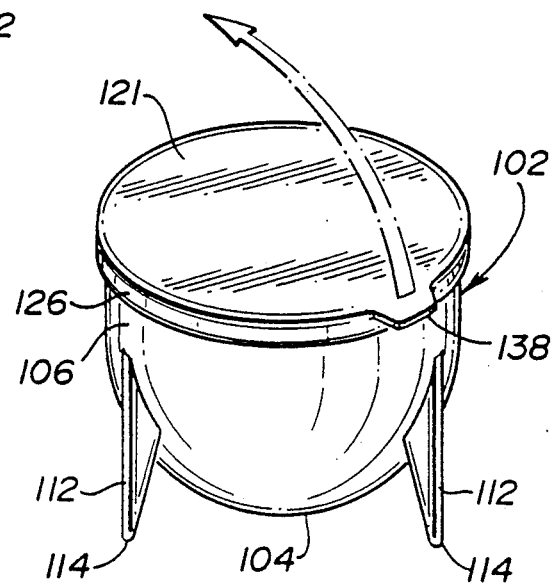
FIG. 8 is a perspective view of the embodiment in FIG. 2 having a snap top.

FIG. 8 illustrates an embodiment where cover 116 is completely closed snap top 121. The snap top has a cover portion and a rim extending from one side of the cover. The rim 126 has an inner diameter about the same as the outer diameter of container 102 at lid support surface 108. Alternatively, there can be a lip and ridge construction similar to that illustrated for cover 116 in FIGS. 5 and 6 Preferably, the cover 121 has a snap tab 138 to facilitate lifting. The snap top 121 "snaps" down over the lid support of container 102.

In use, snap top is "snapped" off of container 102, the contents of container 102 are dispensed directly from the container. Alternatively, a snap top can be the cover 116 in a double cover embodiment shown in FIGS. 5 and 6. The snap top 121 is removed to expose a set of perforations 118 in disc 124. The contents of container 102 are poured or shaken through the set of perforations 118. The container is closed by "snapping" the lid back into place.

FIGS. 9-13 illustrate a preferred embodiment of the present invention having three compartments 110 and a means for closing the compartment which comprises cover 125 with tab closures 127 above each compartment 110.

FIG. 12 illustrates cover 125 with tab closures 127 from a bottom perspective. There is a rim 126 extending from the circumference of cover 125 having an interior lip 133. The cover 125 is mounted on lid support surface 108 of container 102. The container 102 has at least one ridge 120 extending from outer wall 134 at a distance from the lid support surface 108 which is less than the distance of lip 133 from top surface of cover 125. The cover 125 is preferably circular having an outer diameter greater than the corresponding outer diameter of lid support surface 108. The cover 125 is mounted to permanently interlock onto container 102 with lip 133 located beneath ridges 120.

Tab closure 127 is cut out of cover 125 and is hinged at tab hinge 142 located near the center 131 of cover 125. FIG. 11 illustrates a tab closure lock 129 by which tab closure 127 is secured to rim 126 of cover 125 in a closed position. The edges 135 of tab closure lock 129 are beveled so as to "fit" into the cut out portion 137 of rim 126 from which tab closure lock 129 was cut.

In use, tab closure 127 is lifted to expose the contents of compartments 110. To close compartment 110, tab closure 127 is pressed back into original place and beveled edges 135 of tab closure lock 129 fit into cut out portion 137 thereby securing tab closure 127 in a closed position.

Additionally, the means to close the container can be a piece of resealable tape situated over a set of perforations or an aperture in a disc 124 such as that shown in FIGS. 5 and 6. The disc 124 is permanently mounted to lid support surface 108 of container 102. In use the tape is removed, the container contents are poured or shaken through the perforations or aperture and the tape is replaced to close the container.

The type of means to close used on the compartment will depend on the contents of the container and the purpose for which the container is intended. For example, when the article 103 is to be used in a pizza box as in FIG. 4, it is preferable to use a means to close which effectively seals the compartments. An example of such a means is a foil seal as illustrated in FIG. 7. In this way hot moisture from the pizza cannot affect the compartment contents. Additionally, the container contents can be vacuum sealed into the compartments to assure freshness.

Alternatively, the base 104 of container 102 can be perforated to allow the heat from the food item, as for example, in FIG. 4, a pizza, to warm the condiment(s) contained therein if so desired.

The article for supporting the lid of a cardboard box for a food item of the present invention is preferably one piece injection molded of a heat resistant thermosetting or thermoplastic polymeric composition. Alternatively, the article can be constructed of transparent plastic such as a transparent acrylic, oven proof materials such as foil, microwavable materials, or materials which can withstand freezing temperatures. An edible version wherein the container itself is made of a foodstuff, is a further alternative. The container portion of the article can be made of rubberized plastic so that compartments having contents which are the consistency of for example, ketchup, mustard, or syrup can be squeezed out.

In order to facilitate storage of the articles of the present invention, "stackable" articles can be constructed wherein the cover portions are constructed with small grooves which correspond to the support ends of the legs of a second article of the present invention which may be placed on it.

While exemplary embodiments of the invention have been described, the true scope of the invention is to be determined from the following claims.

What is claimed is:

1. In combination:
   a box for a pizza comprising a closable box lid, at least one sidewall, and a base opposite the box lid;
   a pizza packaged therein and supported on the base of the box; and
   an article for supporting the box lid comprising:
      a container having a base, at least one sidewall extending from the base to a lid support opposite the base for supporting the box lid, and there being at least one compartment within the container, between the lid support and the base, the compartment having at least one opening;
      a means to close the opening of at least one compartment;
      at least one support leg extending from the container in a direction opposite the lid support, each leg having a support end opposite the container, the leg supported on the pizza with the lid support located immediately below the box lid when the box lid is closed;
      there being sufficient distance between the base of the container and the support end of each leg to avoid contact between the container and the pizza, and said article having dimensions so as to prevent said box lid from contacting said pizza.

2. The article according to claim 1 wherein the distance between the base of the container and the support end of the legs is from about 10% to 90% of the distance between the lid support surface and the support ends of the legs.

3. The article according to claim 2 wherein the distance between the base of the container and the support end of the legs is from about 30% to 50% of the distance between the lid support surface and the support ends of the legs.

4. The article according to claim 1 wherein there are 3 support legs.

5. The article according to claim 1 wherein the opening is on top of the container.

6. The article according to claim 1 wherein the opening is on the side of the container.

7. The article according to claim 1 wherein there is a means to close the opening of said at least one compartment.

8. The article according to claim 7 wherein the means to close is a dial.

9. The article according to claim 7 wherein the means to close is a snap top.

10. The article according to claim 7 wherein the means to close is a foil seal.

11. The article according to claim 7 wherein the means to close is a tab closure.

12. The article according to claim 1 wherein the container is kettle shaped and has from 2 to 6 compartments.

13. The article according to claim 12 wherein the container has 3 compartments.

14. The article according to claim 1 wherein the base of the container is perforated.

15. The article according to claim 1 which is constructed in one piece of plastic substance.

16. The article according to claim 1 wherein the height of the article is from $\frac{5}{8}$ to $2\frac{7}{8}$ inches.

* * * * *